(12) United States Patent
Wood et al.

(10) Patent No.: US 10,116,605 B2
(45) Date of Patent: Oct. 30, 2018

(54) TRANSPORT STACK NAME SCHEME AND IDENTITY MANAGEMENT

(71) Applicant: CISCO TECHNOLOGY, INC., San Jose, CA (US)

(72) Inventors: Christopher A. Wood, Newport Beach, CA (US); Glenn C. Scott, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 167 days.

(21) Appl. No.: 14/746,490

(22) Filed: Jun. 22, 2015

(65) Prior Publication Data
US 2016/0373390 A1 Dec. 22, 2016

(51) Int. Cl.
G06F 13/00 (2006.01)
H04L 12/58 (2006.01)
H04L 12/24 (2006.01)
H04L 29/08 (2006.01)

(52) U.S. Cl.
CPC ............ *H04L 51/14* (2013.01); *H04L 41/026* (2013.01); *H04L 41/044* (2013.01); *H04L 51/18* (2013.01); *H04L 67/327* (2013.01); *H04L 69/321* (2013.01); *H04L 69/322* (2013.01)

(58) Field of Classification Search
CPC ..... H04L 51/14; H04L 41/026; H04L 41/044; H04L 69/322; H04L 69/321; H04L 67/327; H04L 51/18
USPC ................. 709/245, 220–222, 213–215, 223
See application file for complete search history.

(56) References Cited

U.S. PATENT DOCUMENTS

| 817,441 A | 4/1906 | Niesz |
|---|---|---|
| 4,309,569 A | 1/1982 | Merkle |
| 4,921,898 A | 5/1990 | Lenney |
| 5,070,134 A | 12/1991 | Oyamada |

(Continued)

FOREIGN PATENT DOCUMENTS

| DE | 1720277 A1 | 6/1967 |
|---|---|---|
| DE | 19620817 A1 | 11/1997 |

(Continued)

OTHER PUBLICATIONS

Examination Report in corresponding European Application No. 16173398.5, dated Aug. 23, 2017, 6 pages.

(Continued)

*Primary Examiner* — Kenneth R Coulter

(57) ABSTRACT

An identity management and initialization scheme, along with a naming scheme for a transport stack and its components, facilitates directly addressing each component in the transport stack. During operation, the system receives, by a forwarder, a packet that corresponds to an interest, where the interest includes a name. In response to determining that the interest is destined for a component of a stack of communication modules, the forwarder sends the interest to the destined component based on the name for the interest, where the stack does not require a respective communication module to communicate only with a layer above or below thereof. In response to determining that the interest is not destined for a component of the stack, the forwarder sends the interest to a network element based on the name for the interest. This facilitates directly addressing individual components of the stack.

24 Claims, 7 Drawing Sheets

(56) References Cited

U.S. PATENT DOCUMENTS

| | | |
|---|---|---|
| 5,110,856 A | 5/1992 | Oyamada |
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,733,908 B1 | 6/2010 | Evans |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 9,456,054 B2 * | 9/2016 | Jacobson ............. G06F 15/173 |
| 9,491,201 B2 * | 11/2016 | Bagepalli ............. H04L 63/166 |
| 9,832,291 B2 * | 11/2017 | Solis ....................... H04L 69/18 |
| 9,978,025 B2 * | 5/2018 | Solis ..................... G06Q 10/06 |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |

(56) References Cited

U.S. PATENT DOCUMENTS

| | | |
|---|---|---|
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |

(56) References Cited

U.S. PATENT DOCUMENTS

| | | |
|---|---|---|
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |
| 2016/0036862 A1* | 2/2016 | Bagepalli ............ H04L 63/166 726/1 |
| 2016/0380945 A1* | 12/2016 | Wood .................. H04L 67/327 709/204 |
| 2017/0041420 A1* | 2/2017 | Solis .................. H04L 67/2842 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

(56) References Cited

OTHER PUBLICATIONS

Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
B. Ahlgren et al., 'A Survey of Information-centric Networking' IEEE Commun. Magazine, Jul. 2012, pp. 26-36.
"PBC Library-Pairing-Based Cryptography-About," http://crypto.stanford.edu/pbc. downloaded Apr. 27, 2015.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.

(56) References Cited

OTHER PUBLICATIONS

Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

(56) References Cited

OTHER PUBLICATIONS

The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Anteniese et al., "Improved Proxy Re-Encryption Schemes with Applications to Secure Distributed Storage", 2006.
Xie et al. "Collaborative Forwarding and Caching in Content Centric Networks", Networking 2012.
European Patent Office Communication issued in counterpart European Application No. 16173398.5, dated Jan. 25, 2018, 7 pages.

\* cited by examiner

TRANSPORT STACK NAME SCHEME AND IDENTITY MANAGEMENT

RELATED APPLICATIONS

The subject matter of this application is related to the subject matter in the following applications:

U.S. patent application Ser. No. 13/847,814, now U.S. Pat. No. 9,978,025, entitled "ORDERED-ELEMENT NAMING FOR NAME-BASED PACKET FORWARDING," by inventor Ignacio Solis, filed Mar. 20, 2013 (hereinafter "U.S. patent application Ser. No. 13/847,814");

U.S. patent application Ser. No. 12/338,175, now U.S. Pat. No. 9,456,054, entitled "CONTROLLING THE SPREAD OF INTERESTS AND CONTENT IN A CONTENT CENTRIC NETWORK," by inventors Van L. Jacobson and Diana K. Smetters, filed Dec. 18, 2008 (hereinafter "U.S. patent application Ser. No. 12/338, 175"); and U.S. patent application Ser. No. 14/595,060, now U.S. Pat. No. 9,832,291, entitled "AUTO-CONFIGURABLE TRANSPORT STACK," by inventors Ignacio Solis and Glenn C. Scott, filed Jan. 12, 2015 (hereinafter "U.S. patent application Ser. No. 14/595,060");

the disclosures of which are herein incorporated by reference in their entirety.

BACKGROUND

Field

This disclosure is generally related to a transport framework. More specifically, this disclosure is related to an identity management and initialization scheme for a transport stack, and a naming scheme for the stack and its components.

Related Art

The ubiquitous nature of mobile computing devices and the Internet is making it possible for people to experience digital content from anywhere. People can use applications in their mobile computing devices to consume or interact with content from service providers across the Internet, such as to stream movies or music or to play games with others. These advances in mobile computing are also increasing the quality of content that can be reproduced by these mobile devices and greatly increases the number of devices that can generate and capture digital content and share with others over the Internet. Nowadays, even small mobile devices such as smartphones can produce full high-definition video with high-quality color reproduction, and high-speed cellular and broadband networks make it possible for users to share this content with others over various Internet services, such as the YouTube (from Google, Inc.) and Facebook (from Facebook, Inc.) content-sharing services.

Many computer applications leverage these computer networks and Internet services to provide social features to its users, which greatly enhances the user experience. When an application wants to use the network, it does so by using one or more Application Programming Interfaces (APIs) that run on the computing device's operating system. These APIs provide a way for applications to send, receive, store, configure data or otherwise communicate with other computers across the network.

For example, an application instantiates a protocol stack that implements a network API before the application can use the API to send or receive data over the network. In a traditional protocol stack based on, e.g., the Open Systems Interconnection (OSI) model, each layer can only communicate with the layer above or below it. In a model based on a content-centric network (CCN), a protocol stack can be dynamically created to suit the needs of APIs used by various applications. While the creation of these application-driven protocol stacks can increase the flexibility of a system, the lack of standardization presents challenges in addressing specific components within such a stack.

SUMMARY

One embodiment provides a transport-framework system that facilitates identity management and initialization, including a naming scheme for directly addressing individual components of the stack. During operation, the system receives, by a forwarder, a packet that corresponds to an interest, where the interest includes a name. In response to determining that the interest is destined for a component of a stack of communication modules, the forwarder sends the interest to the destined component based on the name for the interest, where the stack does not require a respective communication module to communicate only with a layer above or below thereof. In response to determining that the interest is not destined for a component of the stack, the forwarder sends the interest to a network element based on the name for the interest. This facilitates directly addressing individual components of the stack.

In some embodiments, the name for the interest includes one or more of: a name for the stack; a name for the forwarder associated with a corresponding portal instance; a name for a component of the stack; and a command associated with a component of the stack.

In some embodiments, a name for a component of the stack is based on one or more of: a hierarchically structured variable length identifier (HSVLI) which comprises contiguous name components ordered from a most general level to a most specific level, wherein the HSVLI is applicable in a portal instance corresponding to the stack; a flat name that does not indicate any hierarchy; a role of the component within the stack; and a unique identifier which is specific to the component of the stack.

In some embodiments, the interest includes a payload which includes a command associated with a component identified by the name for the interest.

In some embodiments, sending the interest to the destined component further involves sending a message included in the interest to the destined component via a message delivery system based on the name for the interest.

In some embodiments, the system receives, from an application, a request to create a portal instance associated with the stack. The system creates the portal instance based on application information included in the request. The system returns the portal instance to the application, where the portal instance indicates the stack, the forwarder associated with the stack, and each component of the stack.

In some embodiments, the application information includes one or more of: a name for the portal instance; and a nonce for the portal instance.

In some embodiments, creating the portal instance is further based on an identity and a private key of a creator of the portal instance. The system stores the private key of the creator in a verifier component of the stack.

BRIEF DESCRIPTION OF THE FIGURES

In the figures, like reference numerals refer to the same figure elements.

DETAILED DESCRIPTION

Figure 1:
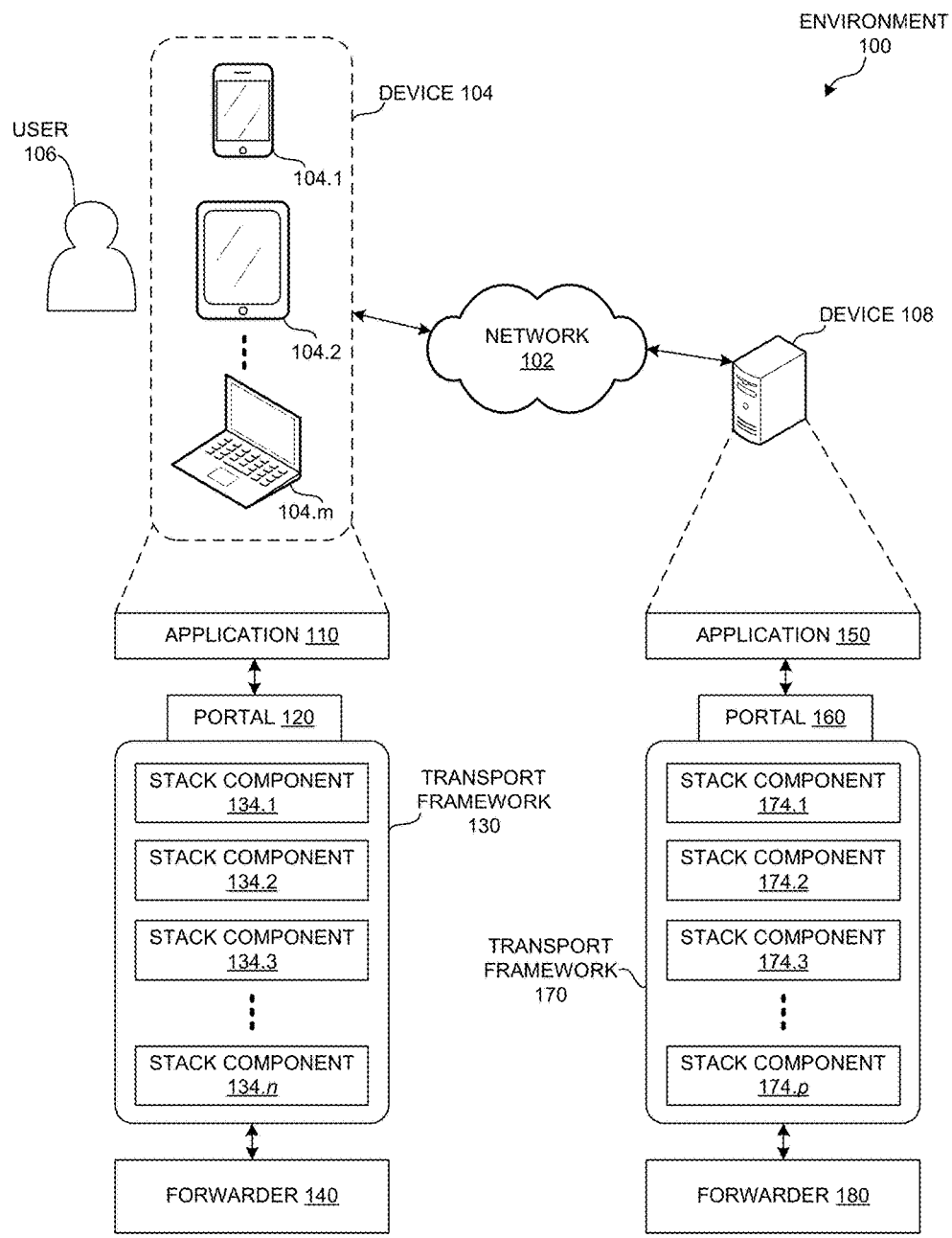
FIG. 1 illustrates an exemplary environment which facilitates directly addressing individual components of a stack, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide an identity management system for a transport framework which solves the problem of directly addressing individual components of a protocol stack. In CCN, the transport framework enables high-level APIs to instantiate a transport stack within the framework. The transport stack can include multiple components or communication modules, and does not adhere to a traditional layered model (e.g., OSI) where each component communicates only with the component below or above it. The transport stack can be created dynamically and configured at runtime, where each of the components within the transport stack performs a specific function. For example, one component of the transport stack can be a verifier component which is responsible for verifying the digital signature of content objects received in response to an interest sent over the network.

Traditionally, an application can communicate over the network by issuing a call to an API, which causes the API to construct a message. This message flows through the appropriate transport stack, visiting various components as the message makes it way to the network. It is difficult to directly address an individual component of the transport stack. Embodiments of the present invention provide an identity management and initialization system which instantiates a portal API instance associated with a specific CCN transport stack. The system further provides a naming scheme which allows any application or component within a transport stack to directly address any component of the same or another transport stack via the associated portal API instance. The naming scheme allows inter- and intra-stack messages (including uniform control messages) to be properly routed at runtime between the portal API, stack components, forwarder instances, and applications in order to change state, configure components, or propagate errors.

A portal API instance can be associated with a specific CCN transport stack, and can provide methods for reading, writing, modifying, and/or deleting metadata associated with the portal instance or its associated stack. CCN transport stacks are configurable and extensible, as described in U.S. patent application Ser. No. 14/595,060, which is herein incorporated by reference. The system can also assign a specific identity to the portal API instance. Similar to setting permissions on a firewall to allow or disallow traffic flow, the specific identity can allow or disallow CCN messages through the portal based on security credentials associated with the identity. The specific identity can further provide a separation between the portal creator and a portal requestor or user. For example, a root user can create a portal instance using his private key, which can be stored in a verifier component of the stack, and a subsequent user or application of the portal instance can rely on the stored private key of the root user (without needing to know the value of the private key) to sign or decode messages flowing through the stack. Creating a portal instance based on a specific identity is described below in relation to FIG. 4.

An application can request a portal instance and use information associated with the portal instance to form interests or messages with names based on the information. The information can include the name of the stack associated with the portal instance, the name of the forwarder associated with the stack, and the name of each component of the stack. Subsequently, the application can directly address any component within the same or another transport stack based on the naming scheme. For example, an individual stack component can be addressed based on the information associated with the portal instance where the name for the stack component can be based on a role or unique identifier for the component. The naming scheme is described below in relation to FIG. 2B. Thus, the system facilitates directly addressing individual components or communication modules of a transport stack.

In some embodiments, the transport framework operates under the CCN architecture. In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In addition, "lci" refers to labeled content information and is a Universal Resource Indicator (URI) compliant identifier in which name segments carry a label. Network protocols such as CCN can use labeled content information by applying specific labels to each name segment of a URI. In a hierarchically structured name, a labeled content name assigns a semantic type or label to each segment. For example, a type of name segment can include a name segment which is a generic name segment that includes arbitrary octets, which allows a CCN to use a binary on-the-wire representation for messages.

The methods disclosed herein are not limited to CCN networks and are applicable to other architectures as well. A description of a CCN architecture is described in U.S. patent application Ser. No. 12/338,175, which is herein incorporated by reference.

Exemplary Network and Communication

FIG. 1 illustrates an exemplary environment 100 which facilitates directly addressing individual components of a stack, in accordance with an embodiment of the present invention. Computing environment 100 can include a computer network 102, such as a CCN. Environment 100 can also include a user 106 associated with a local computing device 104, and a remote computing device 108. Devices 104 and 108 can have internal transport stacks (e.g., associated with transport frameworks 130 and 170, respectively) that exchange network packets with each other over network 102.

In a traditional IP architecture, a forwarder is an IP-based forwarder that looks at the header of a packet to determine the source and the destination for the packet, and forwards the packet to the destination. The stack performs TCP/UDP, and an application interacts with the stack via a socket. In contrast, device 104 of the present invention does not use a conventional "stack." Rather, device 104 via application 110 can request a portal API instance corresponding to a portal 120 which corresponds to transport framework 130. Similarly, device 108 via application 150 can request a portal API instance corresponding to a portal 160 which corresponds to transport framework 170. Applications 110 and 150 can generate requests to retrieve or create the portal API instances associated with portals 120 and 160, respectively. Alternatively, a root user associated with device 104 or device 108 can create the respective portal instances, as described below in relation to FIG. 4.

Device 104 can include any computing device coupled to network 102, such as a smartphone 104.1, a tablet computer 104.2, and/or a server or personal computer 104.*m*. Specifically, device 104 can include application 110 which communicates via portal 120 with transport framework 130. Transport framework 130 can include stack components 134.1-134.*n*. Device 104 can also include forwarder 140 (e.g., a network interface card, or a router in a local area network) which can transfer packets between a stack (and individual stack components) of transport framework 130 and network 102. Similarly, device 108 can include any computing device coupled to network 102, such as a server or an end host device. Device 108 can include application 150 which communicates via portal 160 with transport framework 170. Transport framework 170 can include stack components 174.1-174.*p*. Device 108 can also include a forwarder 180 which can transfer packets between a stack (and individual stack components) of transport framework 170 and network 102. Forwarders 140 and 180 can also facilitate the transfer of packets directly between individual stack components 134.1-134.*n* and 174.1-174.*p*, respectively.

Figure 2A:
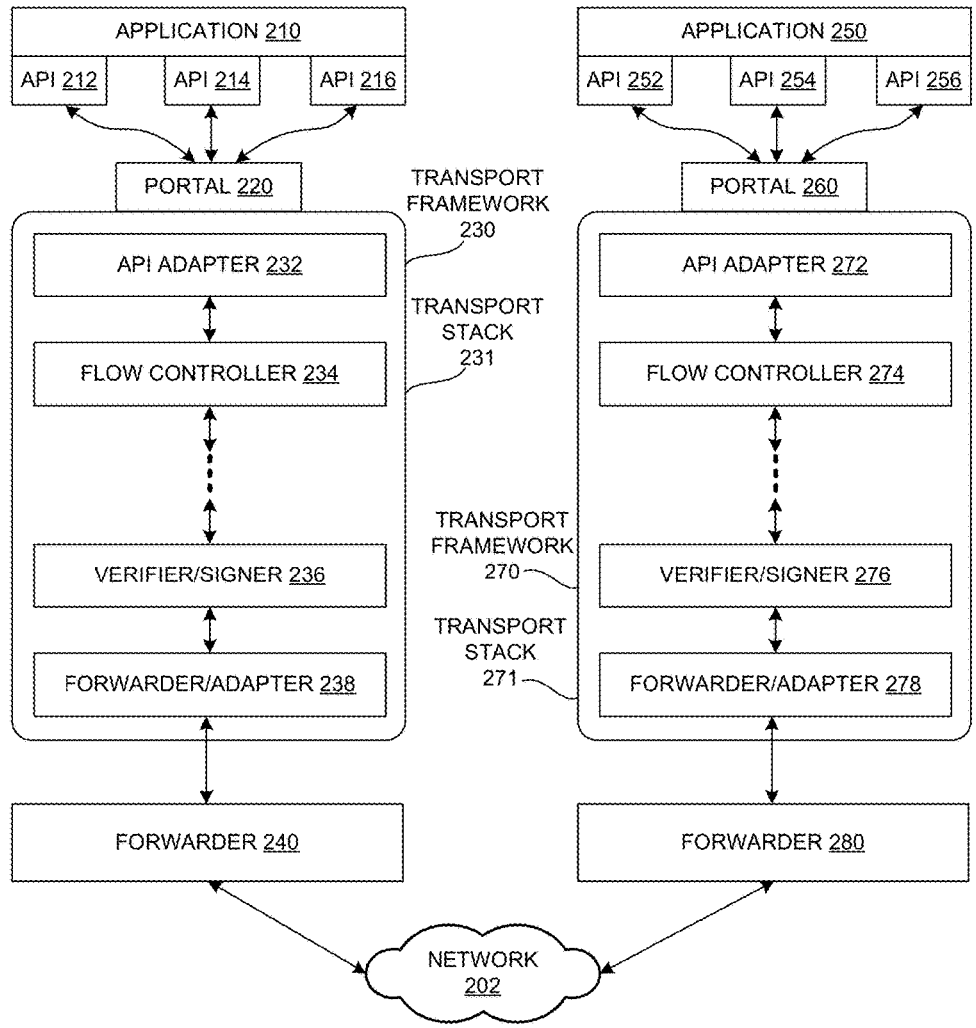
FIG. 2A illustrates an exemplary transport framework, in accordance with an embodiment of the present invention.

FIG. 2A illustrates an exemplary transport framework, in accordance with an embodiment of the present invention. Application 210 and 250 can reside on the same device, or on different devices which communicate via a network 202. Application 210 can use APIs 212, 214, and 216 to communicate over network 202, and APIs 212-216 can interact via a portal 220 with a transport framework 230. Transport framework 230 can include one or more transport stacks which each include multiple stack components or communication modules. In FIG. 2A, transport framework 230 depicts one transport stack (e.g., a transport stack 231) which includes stack components 232-238. An API adapter 232 can communicate between an API and a specific transport stack and transport framework 230. A flow controller 234 can shape and manage traffic, pipeline and transmit interests, and order content objects. A verifier/signer 236 can encode and sign content objects destined for a network element, decode and verify content objects destined for an associated application, encode interests destined for a network element, and decode interests destined for an associated application. A forwarder/adapter 238 can communicate with a forwarder 240. Forwarder 240 can communicate with other forwarders over network 202. Other stack components (not shown) can include functionality related to security (e.g., encryption, decryption, authentication, data signing, signature verification, trust assessment, and filtering), data-processing (e.g., encoding, decoding, encapsulating, decapsulating, transcoding, compression, extraction, and decompression), and storage (e.g., data storage, data retrieval from storage, deduplication, segmentation, and versioning).

Similarly, application 250 can use APIs 252, 254, and 256 to communicate over network 202, and APIs 252-256 can interact via a portal 260 with a transport framework 270. Transport framework 270 can include one or more transport stacks which each include multiple stack components or communication modules. In FIG. 2A, transport framework 270 depicts one transport stack (e.g., a transport stack 271) which includes the following stack components: an API adapter 272; a flow controller 274; a verifier/signer 276; and a forwarder/adapter 278 which can communicate with a forwarder 280. Forwarder 240 can communicate with forwarder 280 over network 202.

The system (via a request from an application or a root user operation or a runtime executable) can create a portal API instance associated with each CCN transport stack. For example, application 210 can request a portal API instance associated with transport stack 231, which includes components 232-238. Creation of the portal API instance is described below in relation to FIG. 4. Upon creation of the portal API instance and using the naming scheme described herein, an application or any individual stack component can send a message directly to any other individual component of the same or another stack. For example, flow controller 234 of transport stack 231 can send a message directly to verifier/signer 276 of transport stack 271. The message can travel over network 202 via forwarders 240 and 280. In some embodiments, the message can travel between application 210 and application 250 via an inter-process communication (IPC) protocol.

Naming Scheme

Figure 2B:
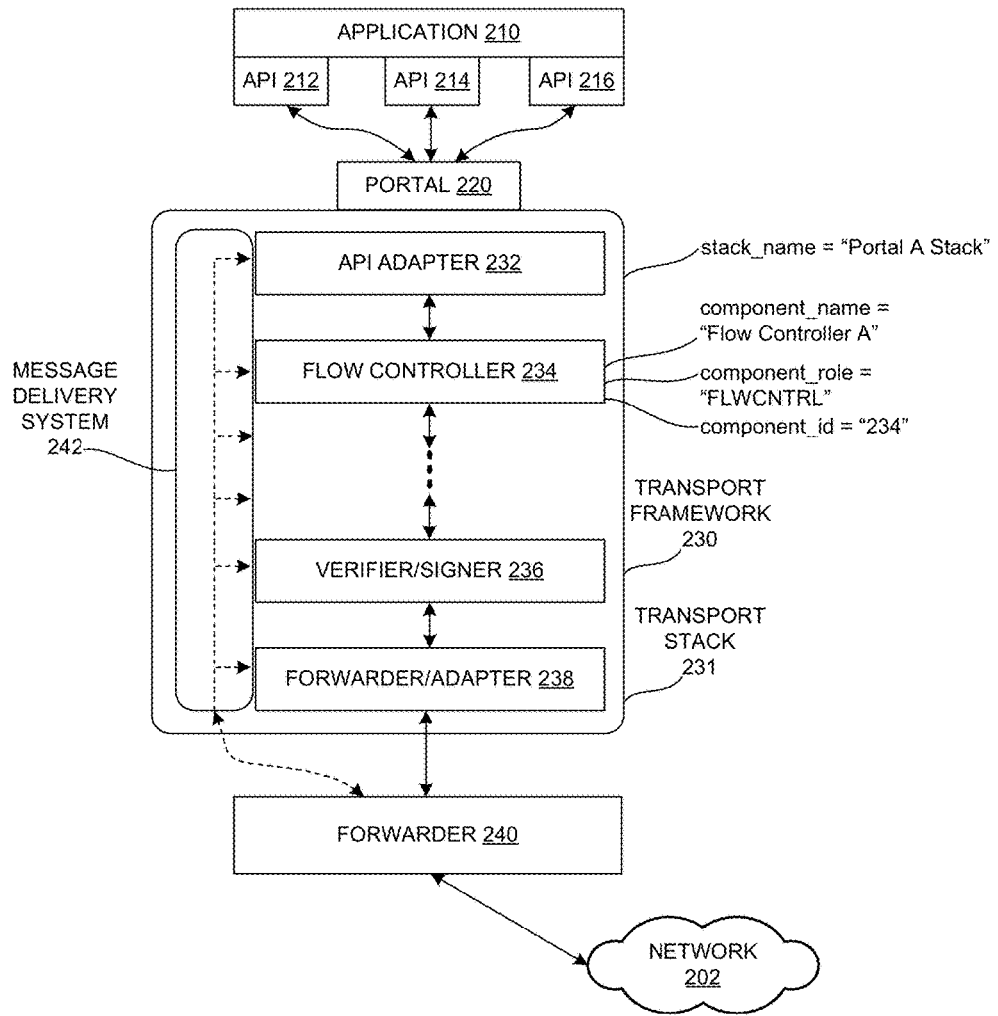
FIG. 2B illustrates an exemplary transport framework corresponding to FIG. 2A, in accordance with an embodiment of the present invention.

FIG. 2B illustrates an exemplary transport framework corresponding to FIG. 2A, in accordance with an embodiment of the present invention. Upon creation of the portal API instance for transport stack 231, the system can provide some or all of the following information to an entity that requests the portal instance: the name of the stack ("stack_name"); the name of each component in the stack ("component_name"); the role of each component in the stack ("component_role"); and a unique identifier for each component in the stack which is specific to the respective component ("component_id"). For example, for transport stack 231 and as depicted in FIG. 2B, the stack_name can have a value of "Portal A Stack," the component_name can have a value of "Flow Controller A," the component_role can have a value of "FLWCNTRL," and the component_id can have a value of "234." The name for a component of a stack can be a hierarchically structured variable length identifier (HSVLI) which comprises contiguous name components ordered from a most general level to a most specific level, where the HSVLI is applicable in a portal instance corresponding to the stack. The name for a stack component can also be a flat name that does not indicate any hierarchy. In some embodiments, the name for a stack component can be based on a role of the stack component or a unique identifier which is specific to the stack component.

Components in a transport stack can be addressed or referred to within the scope of the stack, e.g., by unique identity or by role. For example, interest names for addressing an individual stack component can be based on one of the following formats:

lci:/stack_name/component_name/command (1)

lci:/stack_name/component_role/command (2)

lci:/stack_name/component_id/command (3)

The "command" label can be used to send a message to the stack component to execute a process, configure a setting, or take an action, such as turning a flow controller on or off. The command can be included in the message, as shown above, or can be included in the payload of the interest. For example, based on format (1) and the exemplary values mentioned above, the individual stack components of transport stack 231 can be addressed as follows:

lci:/stack_name="Portal A Stack"/
  component_name="Flow Controller
  A"/command="TURN OFF" (4)

Similarly, based on formats (2) and (3), respectively, and the exemplary values mentioned above, the individual stack components of transport stack 231 can also be addressed as follows:

lci:/stack_name="Portal A Stack"/
  component_role="FLWCNTRL"/
  command="TURN OFF" (5)

lci:/stack_name="Portal A Stack"/component-
  t_id="234"/command="TURN OFF" (6)

Transport framework 230 can also include a message delivery system 242 associated with transport stack 231. Message delivery system 242 can dynamically dispatch or route a message included in an interest to a destined component based on the above-described naming scheme (e.g., an interest with a name as shown by names (4), (5), and (6)).

Role of Forwarder

Figure 3:
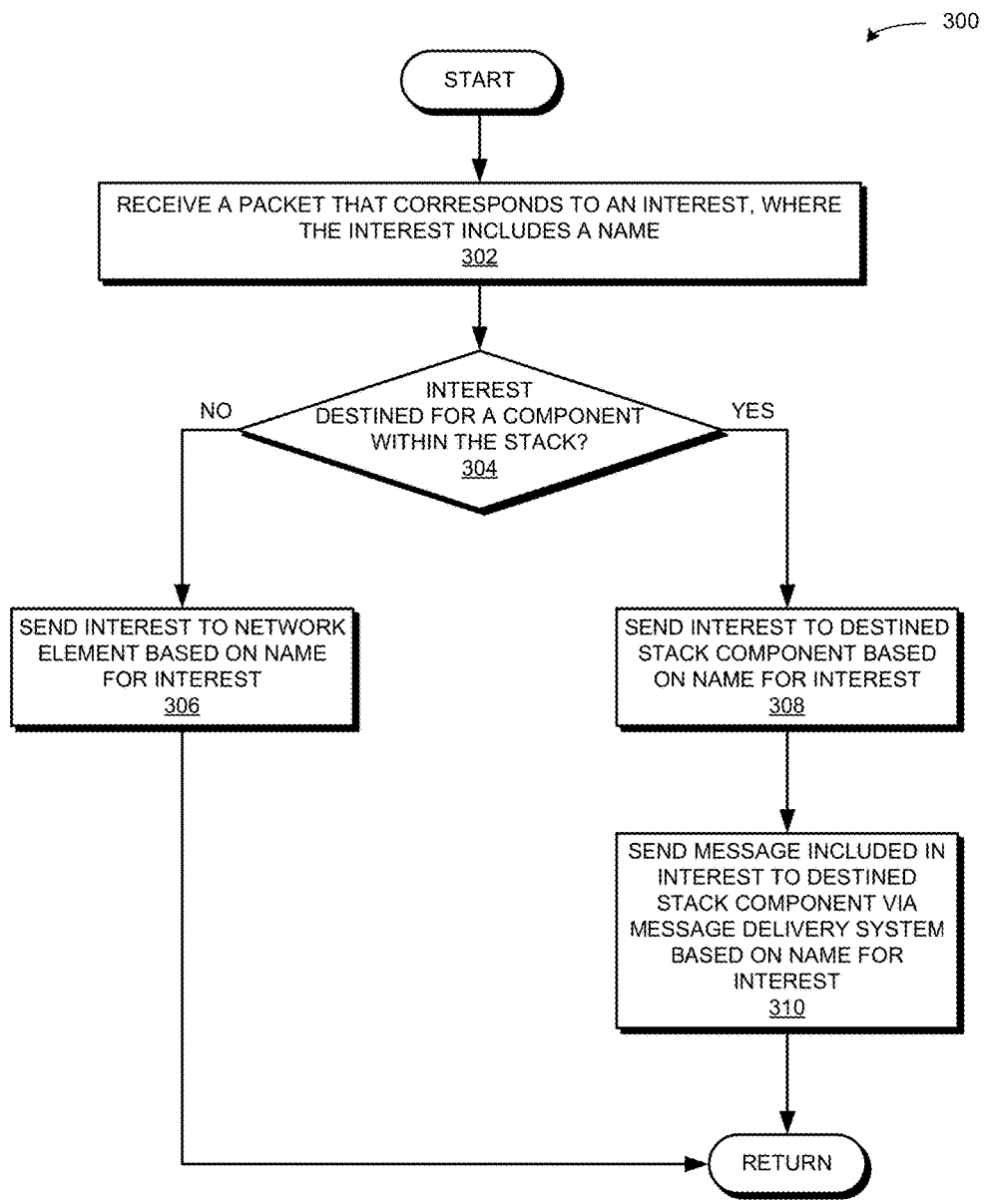
FIG. 3 presents a flow chart illustrating a method for directly addressing individual components of a stack, in accordance with an embodiment of the present invention.

A transport stack of a transport framework can interface with a forwarder, which behaves as a multiplexer/demultiplexer to forward packets to and/or from a stack, an application, or a network interface. In some embodiments, a forwarder can include a logical interface, a physical interface, or a router in a local area network. FIG. 3 presents a flow chart 300 illustrating a method for directly addressing individual components of a stack, in accordance with an embodiment of the present invention. During operation, a forwarder receives a packet that corresponds to an interest, where the interest includes a name (operation 302). The name can include labeled content information, as described above in relation to FIG. 2B. The forwarder is associated with a stack, and a stack includes one or more communication modules or components. The stack does not require a respective communication module or component to communicate only with a layer above or below it. The forwarder determines whether the interest is destined for a component in the stack by inspecting the name for the interest (decision 304). If the interest is not destined for a component of the stack, the forwarder sends the interest to a network element based on the name for the interest (operation 306). For example, forwarder 240 of FIG. 2B can receive an interest with the following name: lci:/stack_name="Other Portal"/stack_component="VER_SIG." Forwarder 240 can determine that the interest is not destined for a component of transport stack 231 (which has a stack_name of "Portal A Stack") and subsequently forward the interest over network 202 to the portal API instance identified by the name "Other Portal." In some embodiments, the name for the interest can indicate a name for the forwarder, such that forwarder 240 can send the interest to the indicated forwarder over network 202.

If the interest is destined for a component of the stack, the forwarder sends the interest to the destined stack component based on the name for the interest (operation 308). The forwarder then sends the message included in the interest to the destined stack component via a message delivery system based on the name for the interest (operation 310). For example, forwarder 240 of FIG. 2B can receive an interest with the name as shown by interest name (4): lci:/stack_name="Portal A Stack"/component_name="Flow Controller A"/command="TURN OFF." Forwarder 240 can determine that the interest is destined for a component of transport stack 231 and subsequently send the message included in the interest to the destined stack component (e.g., the stack component by the name of "Flow Controller A," here, flow controller 234). Specifically, forwarder 240 sends the message included in the interest to the destined stack component via message delivery system 242, which dynamically routes or dispatches the message to flow controller 234.

Creating a Portal Instance

Figure 4:
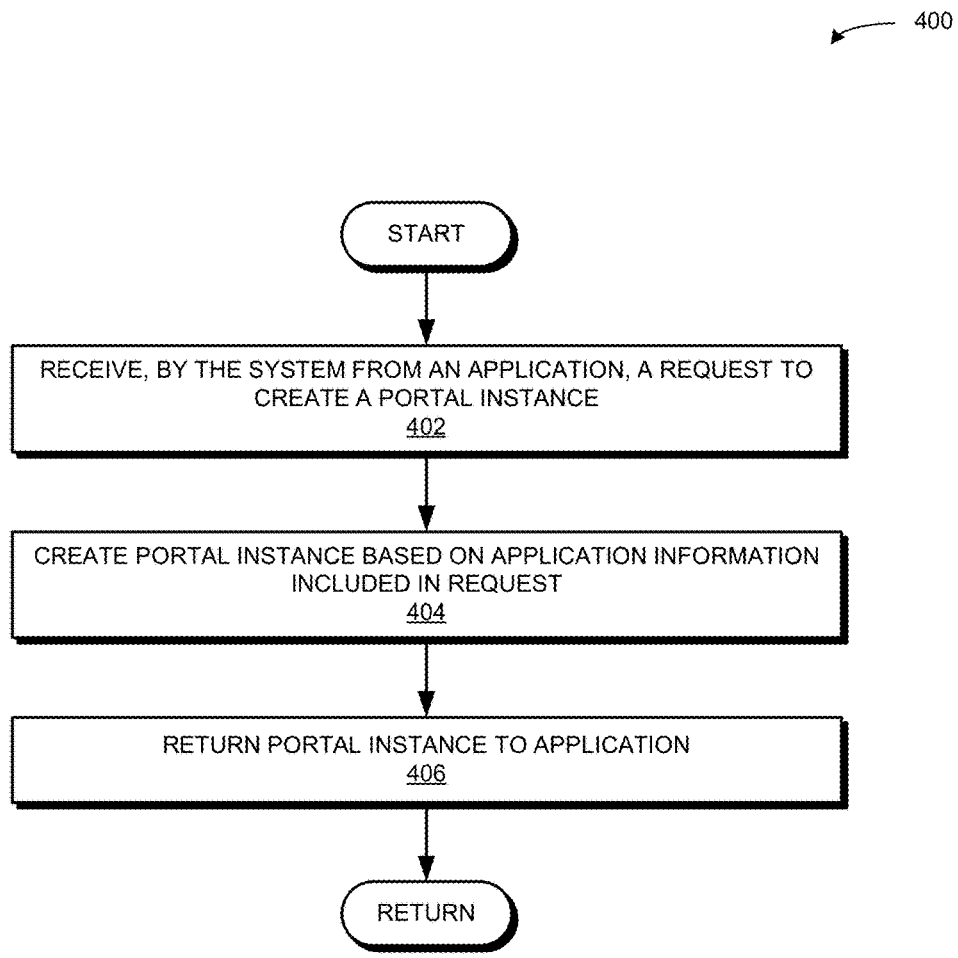
FIG. 4 presents a flow chart illustrating a method for creating a portal instance, in accordance with an embodiment of the present invention.

FIG. 4 presents a flow chart 400 illustrating a method for creating a portal instance, in accordance with an embodiment of the present invention. During operation, the system can receive from an application, a request to create a portal instance (operation 402). The receiving system can be a portal creator or an operating system service, and the request can include application information such as a name and a nonce to be used for the portal instance. In some embodiments, a root user of the system (rather than an application) can be the portal creator. The root user can instantiate a portal instance using the root user's credentials, which can include the identity and private key of the root user. The system can then store the private key of the root user in a verifier component of the transport stack, allowing non-root users on the same system to communicate or interact with the network via the same portal instance. For example, non-root users on the same system as the root user can request and use an existing portal API instance to send content objects (e.g., to create and sign content objects using the root user's credentials via the portal instance) without exposing the security credentials of the portal creator. Furthermore, cryptographically unique information can be used as part of the naming scheme for a transport stack and its internal components, enabling messages to be routed both between stacks components on the same machine and over the network (as described above in relation to FIG. 3).

The system creates the portal instance based on application information included in the request (operation 404). In some embodiments, the request can include the identity of the portal creator and can be digitally signed by the portal creator based on the private key of the portal creator (e.g., the private key of the root user). Creating the portal instance is also based on information obtained from the system (e.g., information relating to the transport framework and associated transport stacks) and information obtained from the localhost forwarder (e.g., a name for the forwarder associated with the stack). Subsequently, the system returns the portal instance to the application (operation 406). The portal instance can indicate a name for the transport stack associated with the portal instance, the forwarder associated with the stack, and each component of the stack.

In some embodiments, services of the operating system can create the portal instance offline or during initialization (e.g., not in response to a request from an application). The operating system can then return a previously created portal instance upon request.

Exemplary Apparatus and Computer System

Figure 5:
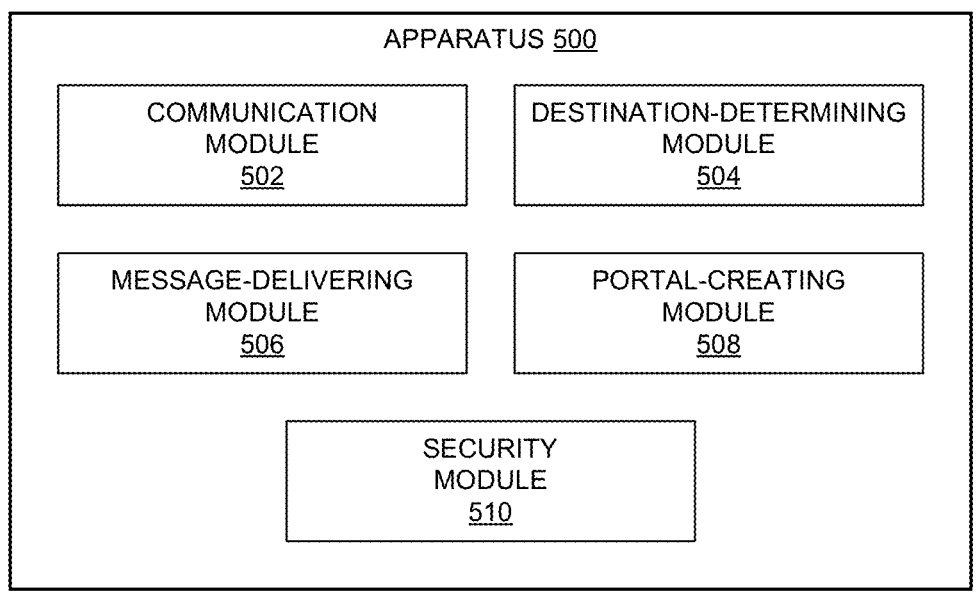
FIG. 5 illustrates an exemplary apparatus that facilitates directly addressing individual components of a stack, in accordance with an embodiment of the present invention.

FIG. 5 illustrates an exemplary apparatus 500 that facilitates directly addressing individual components of a stack, in accordance with an embodiment of the present invention. Apparatus 500 can comprise a plurality of modules which may communicate with one another via a wired or wireless communication channel. Apparatus 500 may be realized using one or more integrated circuits, and may include fewer or more modules than those shown in FIG. 5. Further, apparatus 500 may be integrated in a computer system, or realized as a separate device which is capable of communicating with other computer systems and/or devices. Specifically, apparatus 500 can comprise a communication module 502, a destination-determining module 504, a message-delivering module 506, a portal-creating module 508, and a security module 510.

In some embodiments, communication module 502 can send and/or receive data packets to/from other network nodes across a computer network, such as a content centric network. Destination-determining module 504 can determine whether an interest is destined for a component of a stack of communication modules. In response to determining that the interest is not destined for a component of the stack, communication module 502 can send the interest to a network element based on the name for the interest. In response to determining that the interest is destined for a component of the stack, message-delivering module 506 can send the interest and/or the message to the destined component based on the name for the interest.

Communication module 502 can receive a request to create a portal instance associated with the stack. Portal-creating module 508 can create the portal instance based on application information included in the request. Communication module 502 can return the portal instance to the application. Security module 510 can store a private key of the creator in a verifier component of the stack.

Figure 6:
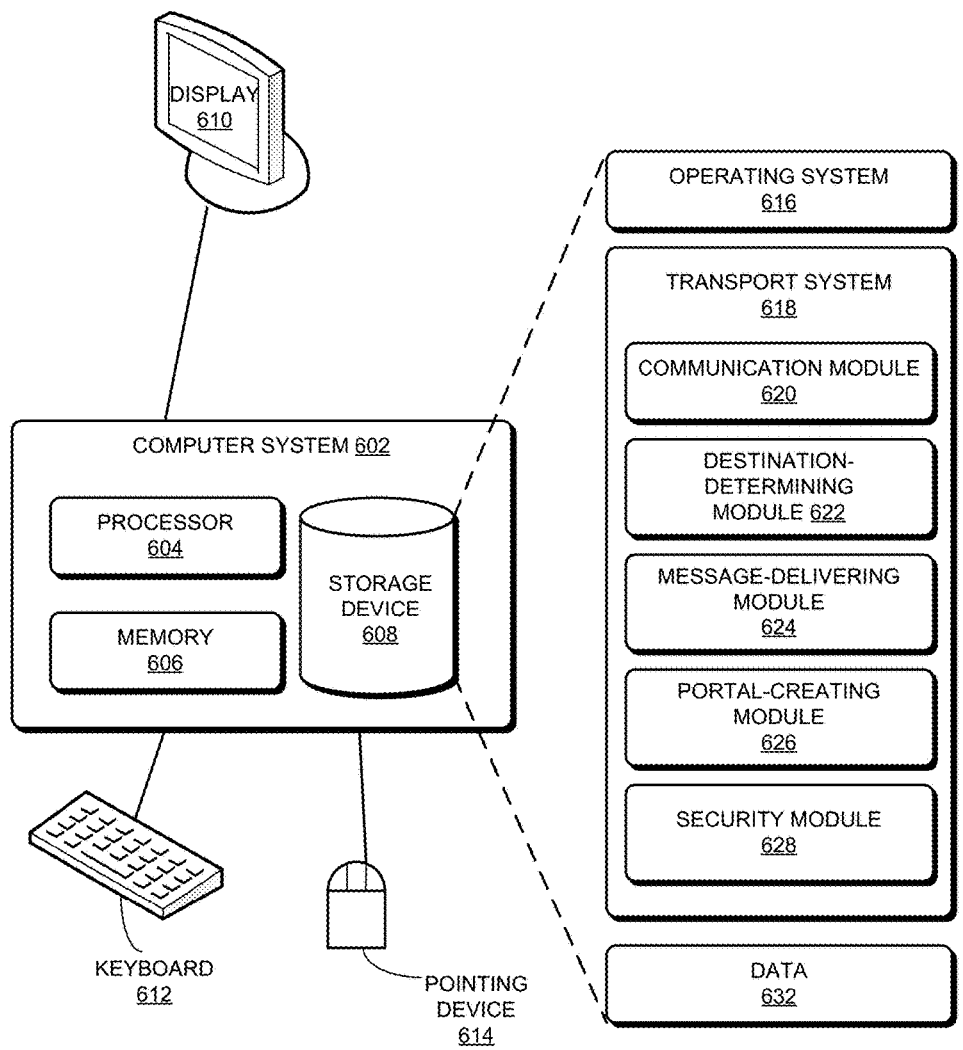
FIG. 6 illustrates an exemplary computer system that facilitates directly addressing individual components of a stack, in accordance with an embodiment of the present invention.

FIG. 6 illustrates an exemplary computer system 602 that facilitates directly addressing individual components of a stack, in accordance with an embodiment of the present invention. Computer system 602 includes a processor 604, a memory 606, and a storage device 608. Memory 606 can include a volatile memory (e.g., RAM) that serves as a managed memory, and can be used to store one or more memory pools. Furthermore, computer system 602 can be coupled to a display device 610, a keyboard 612, and a pointing device 614. Storage device 608 can store an operating system 616, a transport system 618, and data 632.

Transport system 618 can include instructions, which when executed by computer system 602, can cause computer system 602 to perform methods and/or processes described in this disclosure. Specifically, transport system 618 may include instructions for sending and/or receiving data packets to/from other network nodes across a computer network, such as a content centric network (communication module 620). Further, transport system 618 can include instructions for determining whether an interest is destined for a component of a stack of communication modules (destination-determining module 622). Transport system 618 can include instructions for, in response to determining that the interest is not destined for a component of the stack, sending the interest to a network element based on the name for the interest (communication module 620). Transport system 618 can also include instructions for, in response to determining that the interest is destined for a component of the stack, sending the interest and/or the message to the destined component based on the name for the interest (message-delivering module 624).

In addition, transport system 618 can include instructions for receiving a request to create a portal instance associated with the stack (communication module 620) and creating the portal instance based on application information included in the request (portal-creating module 626). Transport system 618 can include instructions for returning the portal instance to the application (communication module 620). Furthermore, transport system 618 can include instructions for storing a private key of the creator in a verifier component of the stack (security module 628).

Data 632 can include any data that is required as input or that is generated as output by the methods and/or processes described in this disclosure. Specifically, data 632 can store at least a packet that corresponds to an interest, where the interest includes a name; a transport framework; a protocol or transport stack; one or more components of a transport or protocol stack; a portal instance associated with a transport or protocol stack; and security credentials of a portal creator.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
   receiving, by a forwarder executed by a hardware processor in a computer network, a packet that corresponds to an interest, wherein the interest includes a name that is location independent;
   in response to determining, with the processor, that the interest is destined for a component of a stack of communication modules that includes a plurality of components, sending the interest to the destined component based on the name for the interest without passing through one or more other components of the stack, wherein the stack does not require a respective communication module to communicate only with a layer above or below thereof; and
   in response to determining, with the processor, that the interest is not destined for any of the components of the stack, sending the interest to a network element based on the name for the interest,
   thereby facilitating directly addressing individual components of the stack.

2. The method of claim 1, wherein the name for the interest includes one or more of:
   a name for the stack;
   a name for the forwarder associated with a corresponding portal instance;
   a name for a component of the stack; or
   a command associated with a component of the stack.

3. The method of claim 1, wherein a name for a component of the stack is based on one or more of:
   a hierarchically structured variable length identifier (HSVLI) which comprises contiguous name components ordered from a most general level to a most specific level, wherein the HSVLI is applicable in a portal instance corresponding to the stack;
   a flat name that does not indicate any hierarchy;
   a role of the component of the stack; or
   a unique identifier which is specific to the component of the stack.

4. The method of claim 1, wherein the interest includes a payload which includes a command associated with a component identified by the name for the interest.

5. The method of claim 1, wherein sending the interest to the destined component further comprises:
   sending a message included in the interest to the destined component via a message delivery system based on the name for the interest.

6. The method of claim 1, further comprising:
   receiving, from an application, a request to create a portal instance associated with the stack;
   creating, with the processor, the portal instance based on application information included in the request; and
   returning the portal instance to the application, wherein the portal instance indicates the stack, the forwarder associated with the stack, and each component of the stack.

7. The method of claim 6, wherein the application information includes one or more of:
   a name for the portal instance; or
   a nonce for the portal instance.

8. The method of claim 6, wherein creating the portal instance is further based on an identity and a private key of a creator of the portal instance, further comprising: storing the private key of the creator in a verifier component of the stack.

9. A non-transitory computer-readable storage medium storing instructions that when executed by a computer cause the computer to perform a method, the method comprising:
   receiving, in a computer network, a packet that corresponds to an interest, wherein the interest includes a name that is location independent;
   in response to determining that the interest is destined for a component of a stack of communication modules that includes a plurality of components, sending the interest to the destined component based on the name for the interest without passing through one or more other components of the stack, wherein the stack does not require a respective communication module to communicate only with a layer above or below thereof; and
   in response to determining that the interest is not destined for any of the components of the stack, sending the interest to a network element based on the name for the interest,
   thereby facilitating directly addressing individual components of the stack.

10. The storage medium of claim 9, wherein the name for the interest includes one or more of:
    a name for the stack;
    a name for the forwarder associated with a corresponding portal instance;
    a name for a component of the stack; or
    a command associated with a component of the stack.

11. The storage medium of claim 9, wherein a name for a component of the stack is based on one or more of:

a hierarchically structured variable length identifier (HSVLI) which comprises contiguous name components ordered from a most general level to a most specific level, wherein the HSVLI is applicable in a portal instance corresponding to the stack;

a flat name that does not indicate any hierarchy;

a role of the component of the stack; or a unique identifier which is specific to the component of the stack.

12. The storage medium of claim 9, wherein the interest includes a payload which includes a command associated with a component identified by the name for the interest.

13. The storage medium of claim 9, wherein sending the interest to the destined component further comprises:

sending a message included in the interest to the destined component via a message delivery system based on the name for the interest.

14. The storage medium of claim 9, wherein the method further comprises:

receiving, from an application, a request to create a portal instance associated with the stack;

creating the portal instance based on application information included in the request; and returning the portal instance to the application, wherein the portal instance indicates the stack, the forwarder associated with the stack, and each component of the stack.

15. The storage medium of claim 14, wherein the application information includes one or more of:

a name for the portal instance; or a nonce for the portal instance.

16. The storage medium of claim 14, wherein creating the portal instance is further based on an identity and a private key of a creator of the portal instance, and wherein the method further comprises:

storing the private key of the creator in a verifier component of the stack.

17. A computer system for facilitating forwarding of packets, the system comprising:

a processor; and a storage device storing instructions that when executed by the processor cause the processor to perform a method, the method comprising:

receiving, in a computer network, a packet that corresponds to an interest, wherein the interest includes a name that is location independent;

in response to determining that the interest is destined for a component of a stack of communication modules that includes a plurality of components, sending the interest to the destined component based on the name for the interest without passing through one or more other components of the stack, wherein the stack does not require a respective communication module to communicate only with a layer above or below thereof; and in response to determining that the interest is not destined for any of the components of the stack, sending the interest to a network element based on the name for the interest, thereby facilitating directly addressing individual components of the stack.

18. The computer system of claim 17, wherein the name for the interest includes one or more of:

a name for the stack;

a name for the forwarder associated with a corresponding portal instance;

a name for a component of the stack; or a command associated with a component of the stack.

19. The computer system of claim 17, wherein a name for a component of the stack is based on one or more of:

a hierarchically structured variable length identifier (HSVLI) which comprises contiguous name components ordered from a most general level to a most specific level, wherein the HSVLI is applicable in a portal instance corresponding to the stack;

a flat name that does not indicate any hierarchy;

a role of the component of the stack; or a unique identifier which is specific to the component of the stack.

20. The computer system of claim 17, wherein the interest includes a payload which includes a command associated with a component identified by the name for the interest.

21. The computer system of claim 17, wherein sending the interest to the destined component further comprises:

sending a message included in the interest to the destined component via a message delivery system based on the name for the interest.

22. The computer system of claim 17, wherein the method further comprises:

receiving, from an application, a request to create a portal instance associated with the stack;

creating the portal instance based on application information included in the request; and returning the portal instance to the application, wherein the portal instance indicates the stack, the forwarder associated with the stack, and each component of the stack.

23. The computer system of claim 22, wherein the application information includes one or more of:

a name for the portal instance; or a nonce for the portal instance.

24. The computer system of claim 22, wherein creating the portal instance is further based on an identity and a private key of a creator of the portal instance, and wherein the method further comprises:

storing the private key of the creator in a verifier component of the stack.

* * * * *